United States Patent
Liu et al.

(10) Patent No.: US 11,230,158 B2
(45) Date of Patent: Jan. 25, 2022

(54) PHASE-CHANGE ENERGY STORAGE AIR DUCT AND AUTOMOBILE AIR CONDITIONING SYSTEM

(71) Applicant: CRRC QINGDAO SIFANG CO., LTD., Shandong (CN)

(72) Inventors: Shaoqing Liu, Shandong (CN); Jianying Liang, Shandong (CN); Peng Lin, Shandong (CN); Dawei Chen, Shandong (CN); Weibin Wang, Shandong (CN); Xiaoguang Sun, Shandong (CN); Chuanying Li, Shandong (CN); Yundong Han, Shandong (CN); Shuanbao Yao, Shandong (CN); Jinyu Zhang, Shandong (CN)

(73) Assignee: CRRC QINGDAO SIFANG CO., LTD., Shandong (CN)

( * ) Notice: Subject to any disclaimer, the term of this patent is extended or adjusted under 35 U.S.C. 154(b) by 269 days.

(21) Appl. No.: 16/329,757

(22) PCT Filed: Aug. 30, 2017

(86) PCT No.: PCT/CN2017/099641
§ 371 (c)(1),
(2) Date: Feb. 28, 2019

(87) PCT Pub. No.: WO2018/041134
PCT Pub. Date: Mar. 8, 2018

(65) Prior Publication Data
US 2019/0217680 A1    Jul. 18, 2019

(30) Foreign Application Priority Data

Aug. 31, 2016  (CN) .......................... 201610793208.2
Oct. 27, 2016  (CN) .......................... 201610958736.9

(51) Int. Cl.
*B60H 1/00*    (2006.01)

(52) U.S. Cl.
CPC .......... *B60H 1/00492* (2013.01); *B60H 1/00* (2013.01); *B60H 1/00021* (2013.01);
(Continued)

(58) Field of Classification Search
CPC .. B60H 1/00; B60H 1/00021; B60H 1/00564; B60H 1/00485; B60H 1/00492;
(Continued)

(56) References Cited

U.S. PATENT DOCUMENTS 2,083,732 A * 6/1937 Moore ............... B01D 53/0423
96/126
4,958,766 A * 9/1990 Toth ................... B60H 1/00492
237/12.3 B
(Continued)

FOREIGN PATENT DOCUMENTS

CN        2603333 Y     2/2004
CN        207045342 U   2/2013
(Continued)

OTHER PUBLICATIONS

The Decision of Refusal of Japanese counterpart Application No. 2019-508912 dated Oct. 6, 2020, 12 pages.
(Continued)

*Primary Examiner* — Tho V Duong
(74) *Attorney, Agent, or Firm* — Womble Bond Dickinson (US) LLP

(57) ABSTRACT

A phase-change energy storage air duct of an automobile air conditioning system. A phase-change energy storage unit (2) is configured inside an air duct (1) of an air conditioning system. By means of phase-change heat absorption or release, residual heat in the air is absorbed, and the heat is released to air with a lower temperature, so that energy is
(Continued)

recycled to achieve energy saving. The temperature of air entering a room or a carriage is kept stable, and thus the user experience is improved. When the air conditioning system fails, the phase-change energy storage unit (2) can still utilize stored cooling capacity or heat to cool down or heat up air in the air duct, so that a supply of air can be kept stable for a period of time, and thus the user experience is improved. The present application also relates to an automobile air conditioning system.

12 Claims, 3 Drawing Sheets

(52) U.S. Cl.
CPC . *B60H 1/00564* (2013.01); *B60H 2001/0015* (2013.01); *Y02T 10/88* (2013.01)

(58) Field of Classification Search
CPC . B60H 2001/0015; Y02T 10/88; F28D 20/02; F28D 20/021; C09K 5/063; F24F 5/0021
See application file for complete search history.

(56) References Cited

U.S. PATENT DOCUMENTS

| | | | | |
|---|---|---|---|---|
| 5,277,038 | A * | 1/1994 | Carr | B60H 1/005 62/434 |
| 5,901,572 | A * | 5/1999 | Peiffer | F28D 20/02 62/480 |
| 6,059,016 | A * | 5/2000 | Rafalovich | B60H 1/00492 165/41 |
| 2002/0139114 | A1* | 10/2002 | Dickau | F01N 3/2882 60/300 |
| 2013/0283827 | A1* | 10/2013 | Wang | F28D 1/0341 62/61 |
| 2014/0208794 | A1* | 7/2014 | Goenka | B60H 1/00335 62/404 |
| 2015/0321538 | A1 | 11/2015 | Su | |

FOREIGN PATENT DOCUMENTS

| | | |
|---|---|---|
| CN | 203421842 U | 2/2014 |
| CN | 104879855 A | 9/2015 |
| CN | 106394169 A | 2/2017 |
| CN | 106427468 A | 2/2017 |
| CN | 208269320 U | 12/2018 |
| JP | S62052348 A | 3/1987 |
| JP | H04208628 A | 7/1992 |
| JP | H08025947 A | 1/1996 |
| JP | 2002067677 A | 3/2002 |
| JP | 2004142630 A | 5/2004 |
| JP | 2008230456 A | 10/2008 |
| JP | 2008265700 A | 11/2008 |
| JP | 2015148392 A | 8/2015 |
| WO | 2015030915 A1 | 3/2015 |

OTHER PUBLICATIONS

The Supplementary European Search Report for European Application No. 17845436 dated Mar. 4, 2020, 6 pages.
The Notice of Reasons for Refusal of Japanese counterpart Application No. 2019-508912 dated Feb. 25, 2020, 12 pages.
The Second Office Action for European Application No. 17845436 dated Nov. 24, 2020, 6 pages.
The Decision of Rejection for Chinese Application No. 201610793208.2 dated Jan. 2, 2019, 4 pages.
The First Chinese Office Action for Chinese Application No. 201610793208.2 dated May 16, 2018, 4 pages.
The First Chinese Office Action for Chinese Application No. 201610958736.9 dated Jul. 4, 2018, 4 pages.
The Second Office Action for Chinese Application No. 201610793208.2 dated Sep. 12, 2018, 4 pages.
The Second Office Action for Chinese Application No. 201610958736.9 dated Mar. 8, 2019, 5 pages.

* cited by examiner

PHASE-CHANGE ENERGY STORAGE AIR DUCT AND AUTOMOBILE AIR CONDITIONING SYSTEM

CROSS-REFERENCE TO RELATED APPLICATIONS

This patent application is a U.S. National Phase Application Under 35 U.S.C. § 371 of International Application No. PCT/CN/099641, filed Aug. 30, 2017, entitled "Phase-Change Energy Storage Air Duct and Automobile Air Conditioning System," which claims priority to Chinese Patent Application No. 2016107932082, filed on Aug. 31, 2016, entitled "Combined-type Automobile Air Conditioning System Based on Phase-change Energy Storage Technology" and Chinese Patent Application No. 2016109587369, filed on Oct. 27, 2016, entitled "Phase-change Energy Storage Air Duct, Automobile Air Conditioning System for Rail Vehicles and Automobiles", the disclosures of which were incorporated by reference in their entireties.

FIELD OF TECHNOLOGY

The present disclosure relates to the technical field of air ducts of air conditioners, and particularly to a phase-change energy storage air duct and a combined-type automobile air conditioning system based on phase-change energy storage technology.

BACKGROUND

An air duct is the passage for air circulation in an air conditioning system. The cooled or heated air finally enters the interior or the carriage through the air duct and participates in the temperature adjustment within the interior or vehicle; when the cooling or heating effect of the air conditioning system is unstable, the temperature of the air entering the air duct will deviate from a set temperature, resulting in a higher or lower temperature of the air entering the carriage or interior. Furthermore, a sudden change in inlet air temperature affects the user experience.

SUMMARY

(I) Technical Problem to be Solved

The technical problem to be solved by the present disclosure is that the temperature of the air entering the room is higher or lower when the cooling or heating effect of the air conditioner is unstable, which affects the user experience.

(II) Technical Solutions

In order to solve the technical problem above, the present disclosure provides a phase-change energy storage air duct, including a phase-change energy storage material provided within an air duct; wherein the phase-change energy storage material is configured to exchange heat with air in the air duct so as to keep a stable temperature of air flowing out from the air duct.

Wherein the phase-change energy storage air duct further includes a phase-change energy storage unit; the phase-change energy storage unit includes an outer layer and a cavity provided within the outer layer; wherein the phase-change energy storage material is provided within the cavity and the outer layer is connected to an inner wall of the air duct; preferably, an inner wall of the air duct is provided with an interlayer, and the phase-change energy storage material is provided within the interlayer.

Preferably, the phase-change energy storage unit extends close to the inner wall of the air duct and is fixed on the inner wall of the air duct.

Preferably, the phase-change energy storage unit protrudes from the inner wall of the air duct.

Preferably, the phase-change energy storage unit has a flat-plate structure, and a cross section of the phase-change energy storage unit along a length direction vertical to the air duct is a closed-loop structure.

Preferably, the phase-change energy storage unit extends or is distributed at intervals along a length direction of the air duct.

Preferably, the entire outer layer has a thin-wall structure and is made of a heat-conducting material.

The present disclosure further discloses an automobile air conditioning system for rail vehicles and automobiles, having the phase-change energy storage air duct as described above.

Specifically, the automobile air conditioning system includes a first branch pipeline and a second branch pipeline arranged in parallel between an air introduction pipeline and an inlet of a fan; wherein the air introduction pipeline is configured to introduce circulating air and/or fresh air, and the fan is configured to sent air to a carriage to cool or heat in the carriage; the first branch pipeline is provided with a phase-change energy storage device including the phase-change energy storage air duct; and the second branch pipeline is provided with an air conditioning device.

Wherein the first branch pipeline and the second branch pipeline are correspondingly provided with a first valve and a second valve to switch opening states of the two branch pipelines.

Wherein a charging air duct is provided between the air conditioning device and the phase-change energy storage device, so as to charge the phase-change energy storage device with the air conditioning device.

Wherein a pipeline connected to an outlet of the fan includes a cooling air supply pipeline and a heating air supply pipeline; wherein the cooling air supply pipeline and the heating air supply pipeline are both connected to the carriage.

Wherein, a temperature sensor is provided on the phase-change energy storage device to feed back an energy storage state of the phase-change energy storage device.

Wherein the automobile air conditioning system further includes a controller electrically connected to the air conditioning device, the fan, the first valve, the second valve and the temperature sensor respectively.

(III) Advantageous Effects

The technical solutions above have the following merits: for the phase-change energy storage air duct and the automobile air conditioning system for rail vehicles and automobiles of the present disclosure, a phase-change energy storage unit is provided within an air duct of an air conditioning system, by means of phase-change heat absorption or release, redundant heat in the air is absorbed and the heat is released to air with a lower temperature, so that energy is recycled to achieve energy saving. The temperature of air entering an interior or a carriage is kept stable, and thus the user experience is improved. When the air conditioning system fails, the phase-change energy storage unit can still utilize stored cooling capacity or heat to cool down or heat up air entered the air duct, so that a supply of air can be kept stable for a period of time, and thus the user experience is improved.

For the combined-type automobile air conditioning system based on phase-change energy storage technology of the present disclosure, by arranging the phase-change energy storage device and the air conditioning device in parallel, the air is directly sent to the carriage after it exchanges heat with the phase-change energy storage device and the air conditioning device, and the phase-change energy storage device and the air conditioning device do not affect each other, so as to ensure the stable temperature of the respective processed air and the stable cooling or heating effect within the carriage.

Figure 1:
FIG. 1 is a cross section view of the phase-change energy storage air duct of an embodiment of the present disclosure.

Wherein, 1. air duct; 2. phase-change energy storage unit; 21. phase-change energy storage material; 22. outer layer; 31. phase-change energy storage device; 32. air conditioning device; 33. charging air duct; 4. fan; 51. first valve; 52. second valve; A. air introduction pipeline; B. cooling air supply pipeline; C. heating air supply pipeline.

DETAILED DESCRIPTION

The specific implementation manners of the present disclosure will be further described in detail with reference to the accompanying drawings and embodiments. The following embodiments are used to illustrate the present disclosure, but are not intended to limit the scope thereof.

In the description of the present disclosure, it should be noted that unless defined otherwise, "more than" includes the number itself, and "a plurality of" means more than two; the orientation or position relations indicated by the terms "upper", "lower", "left", "right", "inside", "outside", "front end", "rear end", "head portion", "tail portion" etc. are based on the orientation or position relations shown in the drawings, which is merely for the convenience of describing the present disclosure and simplifying the description, and is not to indicate or imply that the device or component referred to must have a specific orientation, is constructed and operated in a specific orientation. Therefore it cannot be construed as limiting the present disclosure. In addition, the terms "first", "second" and "third" etc. are for the purpose of description, and cannot be construed as indicating or implying the relative importance.

In the description of the present disclosure, it also should be noted that unless specifically defined or limited, the terms "mount", "connect to", and "connect with" should be understood in a broad sense, for example, they may be fixed connections or may be removable connections, or integrated connections; may be mechanical connections or electrical connections; they may also be direct connections or indirect connections through intermediate medium. For a person of ordinary skill in the art, the specific meanings of the terms above in the present disclosure can be understood according to specific situations.

As shown in FIG. 1-FIG. 4, the present disclosure discloses a phase-change energy storage air duct, including a phase-change energy storage unit 2 provided within an air duct 1; wherein the phase-change energy storage unit 2 is configured to exchange heat with air in the air duct 1 so as to keep a stable temperature of air flowing out from the air duct 1. A suitable phase-change energy storage unit 2 is selected, so that a phase change temperature of the phase-change energy storage unit 2 is close to a set temperature of the air conditioner. When the temperature of the airflow entering the air duct 1 is higher, the phase-change energy storage unit 2 absorbs heat and liquefies so as to lower the temperature of the air in the air duct 1 and reduce the difference value between the air temperature and the set temperature, so that the temperature of the air entering the interior or carriage is closer to the set temperature, thus the user experience is prevented from being affected by a sudden temperature increase; when the temperature of the airflow entering the air duct 1 is lower, the phase-change energy storage unit 2 turns from a liquid state to a solid state, and the heat generated in the phase change process is used to raise the temperature of the air in the air duct 1 so that the temperature of the air entering the interior or vehicle is closer to the set temperature, so that the user experience is prevented from being affected by a sudden temperature decrease. That is, by selecting a phase-change energy storage unit 2 having a suitable phase change temperature and utilizing the characteristics of heat absorption or heat release during the phase change process to adjust the temperature of the air in the air duct 1, so that the temperature fluctuation of the air exhausted from the air duct 1 is reduced and the user experience is improved. When the air conditioning system fails, the phase-change energy storage unit 2 in the air duct 1 can still release cooling capacity or heat to keep a stable temperature of the inlet air and prevent the air outside from directly entering the carriage, that is, a supply of air can be still kept stable for a period of time when a failure occurs. At the same time, the phase-change energy storage unit 2 stores redundant cooling capacity or heat and releases it when needed, thus avoiding an energy waste and achieving an energy saving.

Preferably, as shown in FIG. 1, the phase-change energy storage unit 2 is arranged on an inner wall of the air duct 1. The phase-change energy storage unit 2 may be fixed to the inner wall of the air duct 1 by means of adhesion, welding, bonding, etc. Of course, the phase-change energy storage unit 2 may also be fixed on the inner wall of the air duct 1 in other ways, which is not limited by the present disclosure.

In order to avoid obstructing the air flow, the phase-change energy storage unit 2 preferably extends close to the inner wall of the air duct 1.

Preferably, the phase-change energy storage unit 2 is a flat-plate structure, and a plurality of the phase-change energy storage units 2 is distributed at intervals. That is, the phase-change energy storage unit 2 is a plurality of flat-plate structures arranged along the inner wall of the air duct 1, and the each of the flat-plate structures is spaced apart so as to realize simultaneous heat exchange at multiple places and improve the heat exchange efficiency. This structure is convenient in installation, and can flexibly control the installation density and the length of the heat exchange range etc., and facilitate operation.

Preferably, as shown in FIG. 1, a cross section of the phase-change energy storage unit 2 along a length direction vertical to the air duct 1 is a closed-loop structure. In this way, the inner wall of the entire air duct 1 can participate in heat exchange, thus the heat exchange area is maximized and the heat exchange efficiency is high.

Further, the phase-change energy storage unit 2 may also be arranged to protrude from the inner wall of the air duct 1 to further increase the contact area with the air in the air duct 1, thereby improving the heat exchange efficiency and rate. It can be understood that, since the air duct 1 is functioned to pass the air, although the phase-change energy storage unit 2 protrudes from the inner wall of the air duct 1, it will not block the air duct 1 so that air cannot pass through the air duct 1.

Figure 3:
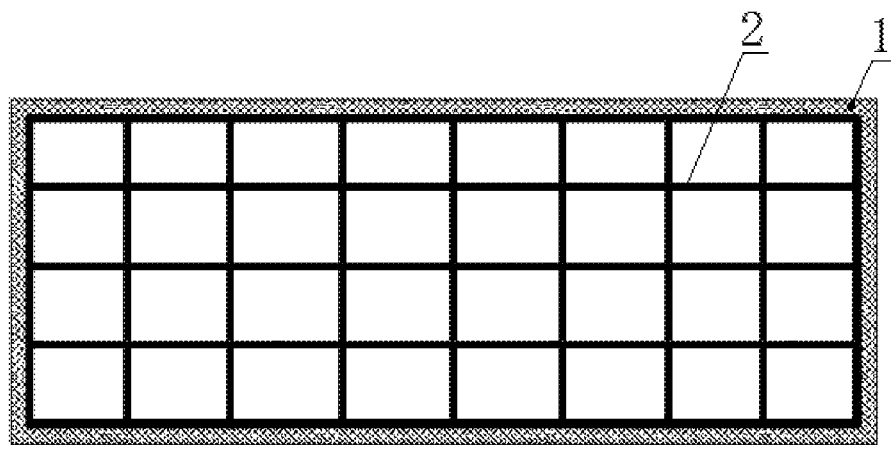
FIG. 3-FIG. 5 are cross section views of the phase-change energy storage air duct of embodiments of the present disclosure.

Preferably, as shown in FIG. 3, the phase-change energy storage unit 2 may form a structure having a regular shape, such as a mesh structure and a hollow structure, etc.; preferably, a structure having a regular shape formed by the phase-change energy storage unit 2 can fill the cross section of the air duct 1 so as to increase the heat exchange area as much as possible without obstructing the air flow, thereby improving the heat exchange efficiency and rate.

It should be noted that, the embodiment above is only one of many preferred embodiments in which the phase-change energy storage unit 2 is arranged to protrude from the inner wall of the air duct 1. In the case where the contact area with the air is increased without blocking the air duct 1, the phase-change energy storage unit 2 may be arranged to protrude from the inner wall of the air duct 1 in a plurality of ways, which will not be described one by one in the present disclosure.

Further, the phase-change energy storage unit 2 extends or is distributed at intervals along the length direction of the air duct 1. That is, the phase-change energy storage unit 2 may extend along the length direction of the air duct 1 in the shapes above (as shown in FIG. 1 and FIG. 3); alternatively, a plurality of phase-change energy storage units 2 may be distributed at intervals along the length direction of the air duct 1, which can be considered as a complete phase-change energy storage unit 2 being separated into a plurality of discrete segments along the length direction of the air duct 1. In this way, not only the installation is convenient, the heat exchange range within the air duct 1 can also be changed by changing the number of the phase-change energy storage unit 2.

It should be noted that, the air duct 1 of the present disclosure is not limited to the most commonly used single-port air ducts, but includes the generally defined air ducts, such as multi-port air ducts (for example, " 圖 "-shaped air ducts, honeycomb-structure multi-port air ducts, etc.).

Figure 4:
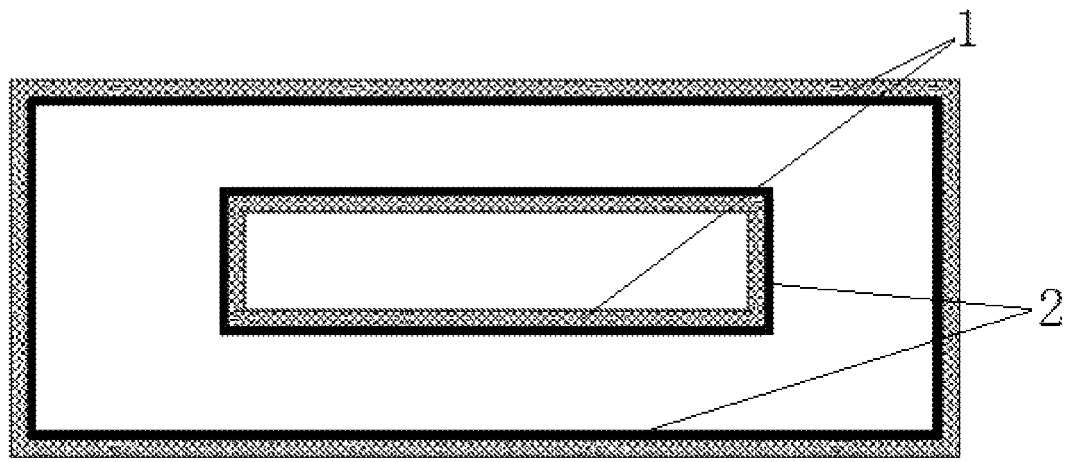
Figure 5:
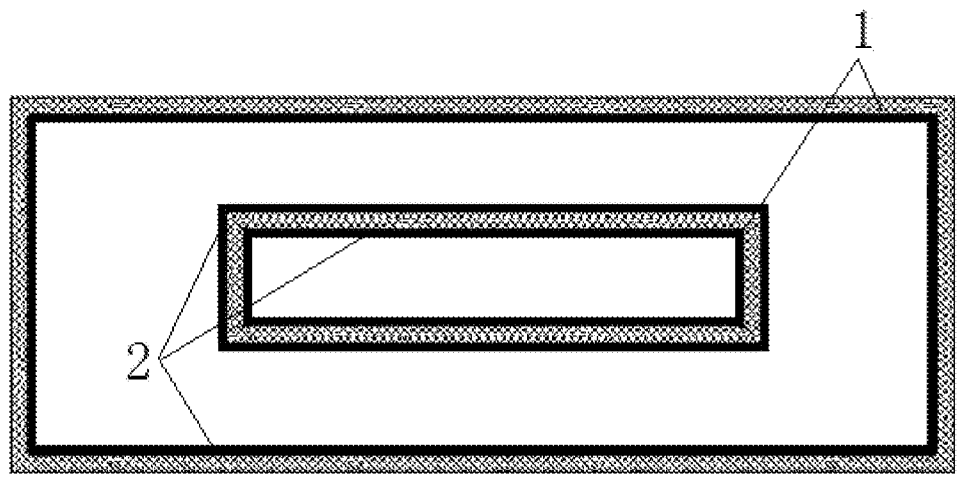

For example, as shown in FIG. 4 and FIG. 5, the air duct 1 can be a " 圖 "-shaped air duct. When the air duct 1 is a " 圖 "-shaped air duct, the phase-change energy storage unit 2 can still be arranged to be close to the inner wall of the air duct 1, or protrude from the inner wall of the air duct 1 to further increase the heat exchange area and improve the heat exchange efficiency and/or rate.

Figure 2:
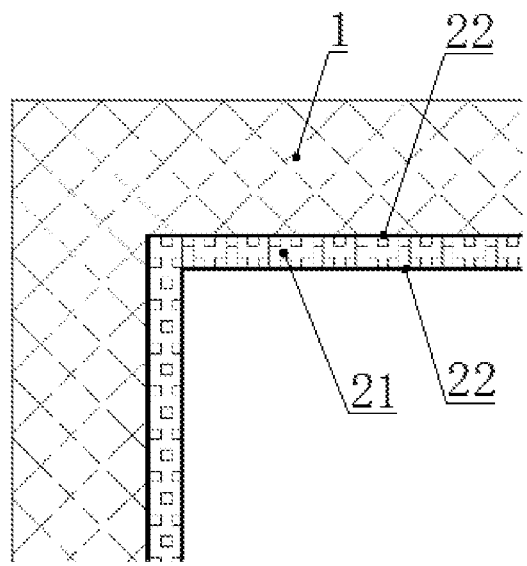
FIG. 2 is partially enlarged view of FIG. 1.

Specifically, as shown in FIG. 2, the phase-change energy storage unit 2 includes an outer layer 22 and a phase-change energy storage material 21. A cavity is formed in the outer layer 22, the phase-change energy storage material 21 is provided within the cavity, and the outer layer 22 is connected to the inner wall of the air duct 1. Since the phase-change energy storage material 21 has a low phase changing temperature and is easily changed from a solid state to a liquid state, it is necessary to provide an outer layer 22 on an outer side of the phase-change energy storage material 21 for wrapping, so that the liquefied phase-change energy storage material 21 still remains in the cavity of the outer layer 22, therefore no leakage will occur and the safety is ensured. In order to ensure the heat exchange efficiency, the outer layer 22 should be kept with the same thickness everywhere and as thin as possible to facilitate heat transfer.

Preferably, the entire outer layer 22 is a thin-wall structure. That is, the shape of the entire phase-change energy storage unit 2 is a thin-wall structure, and the inner cavity accommodating the phase-change energy storage material 21 is extended in plane, so that the phase-change energy storage unit 2 has the phase-change energy storage material 21 everywhere, so as to ensure the heat exchange efficiency.

Further, the outer layer 22 is made of a heat-conducting material. Since heat is mainly transferred between the air and the phase-change energy storage material 21, the outer layer 22 is arranged only to wrap the phase-change energy storage material 21; therefore, in order to reduce the heat transfer resistance, the outer layer 22 should be made of a heat-conducting material, in particular, a material having a high thermal conductivity, such as copper or aluminum etc. Of course, the outer layer 22 can also be other materials having a high thermal conductivity, which is not limited in the present disclosure. In this way, not only the purpose of wrapping the phase-change energy storage material 21 is achieved, but also the heat exchange with a minimal heat transfer resistance is achieved, therefore the heat exchange efficiency is ensured.

Alternatively, the inner wall of the air duct 1 can be provided with an interlayer in which the phase-change energy storage material 21 is wrapped. In this way, the processing technology and process of the air duct 1 can be further simplified to improve the production efficiency.

It should be understood that, after the interlayer is provided, one side of the interlayer contacted with the air in the duct 1 is preferably a thin-wall structure and should be made of a heat-conducting material (preferably a material having a high thermal conductivity).

The present disclosure further discloses an automobile air conditioning system for rail vehicles and automobiles, having the phase-change energy storage air duct as described in the embodiments above. That is, the phase-change energy storage air duct can be used for the automobile air conditioner of an ordinary car, and can also be used for the automobile air conditioner of a rail vehicle such as a high-speed train and a bullet train. It only needs to add the phase-change energy storage unit 2 in the existing air duct 1 to adjust the temperature of the airflow entering the carriage, so that the temperature of the air entering the carriage is stable and the temperature fluctuation is small. When the temperature of the airflow is high, the temperature of the airflow is higher than the phase-change temperature, and the phase-change energy storage material 21 changes the phase from the solid state to the liquid state after absorbing heat, so that the air in the air duct 1 releases heat and then the temperature thereof is lowered, and the temperature of the air entering the carriage drops to a state closer to the set temperature, therefore the hotter airflow is prevented from being directly blown into the carriage and affecting the user experience. When the temperature of the airflow is low, the temperature of the airflow is lower than the phase-change temperature, and the phase-change energy storage material 21 changes the phase from the liquid state to the solid state after releasing heat, so that the air in the air duct 1 adsorbs heat and then the temperature thereof is raised, and the temperature of the air entering the carriage increases to a state closer to the set temperature, therefore the colder airflow is prevented from being directly blown into the carriage and affecting the user experience. When the vehicle is powered off or the air conditioning system fails, the phase-change energy storage unit 2 in the air duct 1 can still release cooling capacity or heat to keep a stable temperature of the inlet air and prevent the air outside from directly entering the carriage, that is, a supply of air can be still kept stable for a period of time when a failure occurs. At the same time, the phase-change energy storage unit 2 stores redundant cooling capacity or heat and releases it when needed, thus avoiding energy wastes and achieving energy savings.

Figure 6:
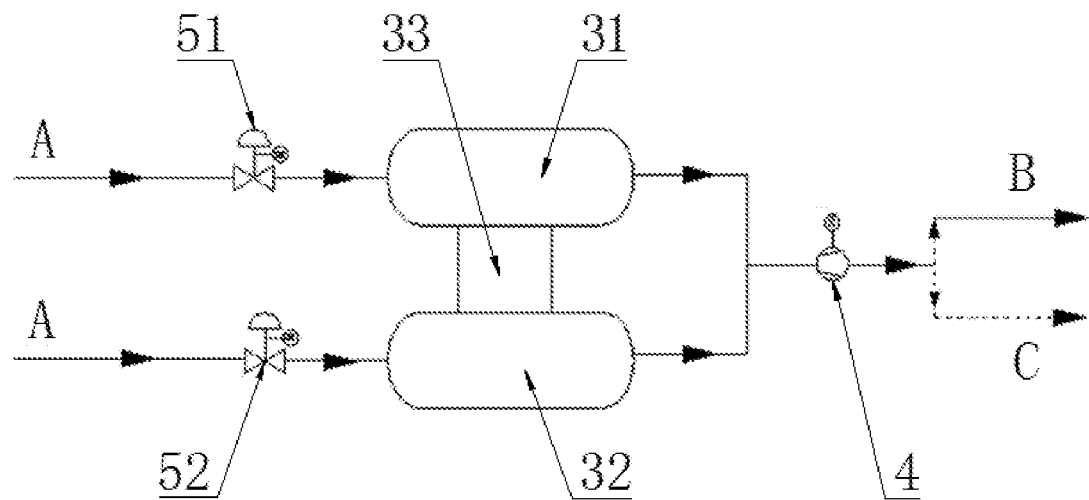
FIG. 6 is a structural diagram of the automobile air conditioning system of an embodiment of the present disclosure.

Specifically, as shown in FIG. 6, the automobile air conditioning system includes a first branch pipeline and a second branch pipeline arranged in parallel between an air introduction pipeline A and an inlet of a fan 4. The air introduction pipeline A is configured to introduce circulating air and/or fresh air, and the fan 4 is configured to sent air to the carriage to cool or heat the carriage; the first branch pipeline is provided with a phase-change energy storage device 31 including the phase-change energy storage air duct described in each of the embodiments above. The second branch pipeline is provided with an air conditioning device 32. The air conditioning device 32 and the phase-change energy storage device 31 are separately provided, and the circulating air, the fresh air or the mixed airflow thereof are respectively exchanged heat with the air conditioning device 32 and the phase-change energy storage device 31 to adjust the temperature of the air, and the airflow is sent into the carriage after the cooling or heating requirement within the carriage is met. After the air completes heat exchange in the carriage, a part of the air is returned to the air introduction pipeline A to participate in the circulation, and the other part of the air is directly discharged to provide space for introducing the fresh air. The air is sent to the carriage after exchanging heat with the air conditioning device 32 or the phase-change energy storage device 31 separately. The air conditioning device 32 and the phase-change energy storage device 31 do not affect each other, so as to ensure that the temperature of the air entering the carriage is stable and will not be higher or lower, thus improving the riding comfort. Regardless of whether the air passes through the first branch pipeline or the second branch pipeline, as long as the phase-change energy storage device 31 stores sufficient energy and the output power of the air conditioning device 32 is suitable, the temperature of the air entering the carriage can be ensured to be stable and meet the requirement of cooling or heating.

Further, the first branch pipeline and the second branch pipeline are correspondingly provided with a first valve 51 and a second valve 52 to switch the opening states of the two branch pipelines. That is, by adjusting the opening and closing states or the opening extent of the first valve 51 and the second valve 52, a total amount of the air entering the first branch pipeline and the second branch pipeline can be adjusted. When the phase-change energy storage device 31 stores sufficient energy, the air flow of the first branch pipeline can be increased and the air flow of the second branch pipeline can be reduced, so as to reduce the load of the air conditioning device 32 and save the electric energy. When the phase-change energy storage device 31 stores insufficient energy, the air flow of the first branch pipeline can be reduced and the air flow of the second branch pipeline can be increased, so that the air conditioning device 32 performs most of the cooling or heating operations to ensure the cooling or heating effect in the carriage and improve the riding comfort. Of course, the above description is only by way of example, and the opening and closing state and the opening extent of the first valve 51 and the second valve 52 can be adjusted according to actual conditions, which is not limited by the present disclosure.

Further, a charging air duct 33 is provided between the air conditioning device 32 and the phase-change energy storage device 31 to charge the phase-change energy storage device 31 with the air conditioning device 32. When the phase-change energy storage device 31 stores less energy and cannot cool or heat the introduced gas, and there is no need for heating or cooling in the carriage or the cooling or heating load of the carriage is low, the charging air duct 33 can be opened to charge the phase-change energy storage device 31. For example, when the air temperature outside is close to the set temperature for cooling or heating, the first valve 51 and the charging air duct 33 can be opened, the second valve 52 can be closed, and the air introduction pipeline A directly introduces the fresh air outside into the first branch pipeline, after the fresh air performs simple heat exchange with the phase-change energy storage device 31, the fresh air is directly introduced into the carriage. In this process, the phase-change energy storage device 31 needs to provide or absorb less heat and a stable temperature of the air entering the carriage can be kept; meanwhile, air conditioning device 32 charges the phase-change energy storage device 31 through the charging air duct 33.

Of course, when the combined-type automobile air conditioning system based on phase-change energy storage technology is in a cooling state, and the temperature of the air outside is lower than the set temperature of the carriage, the fresh air outside can be directly introduced into the first branch pipeline, which can be used for not only supplying cooling capacity to the phase-change energy storage device 31, but also cooling the carriage, and there is no need to turn on the air conditioning device 32, thus saving the electric energy. Similarly, when the combined-type automobile air conditioning system based on phase-change energy storage technology is in a heating state, and the temperature of the air outside is higher than the set temperature of the carriage, the fresh air outside can be directly introduced into the first branch pipeline, which can be used for not only supplying heat to the phase-change energy storage device 31, but also heating the carriage, and there is no need to turn on the air conditioning device 32, thus saving the electric energy.

Preferably, the pipeline connected to an outlet of the fan 4 includes a cooling air supply pipeline B and a heating air supply pipeline C. The cooling air supply pipeline B and the heating air supply pipeline C are both connected to the carriage. That is, the pipeline connecting to the outlet of the fan 4 can be divided into the cooling air supply pipeline B and the heating air supply pipeline C, which is a theoretical structure. In fact, a same pipeline can be used as the cooling air supply pipeline B and the heating air supply pipeline C, except that the combined-type automobile air conditioning system based on phase-change energy storage technology has different working states.

Preferably, a temperature sensor is provided on the phase-change energy storage device 31 to feed back an energy storage state of the phase-change energy storage device 31. The energy stored in the phase-change energy storage device 31 can be visually reflected by a temperature change. Therefore, it is preferable to provide a temperature sensor on the phase-change energy storage device 31 to monitor an energy storage condition of the phase-change energy storage device 31 in time to ensure a stable temperature inside the carriage.

Further, the system also includes a controller. The controller is electrically connected to the air conditioning device 32, the fan 4, the first valve 51, the second valve 52 and the temperature sensor respectively. All devices are controlled centrally by the controller, therefore the operation is convenient and the response is fast, so that the temperature fluctuation of the air in the carriage is small and the riding comfort is high. Preferably, the fan 4 is a centrifugal fan.

It can be seen from the embodiments above that, in the present disclosure, by arranging the phase-change energy storage device 31 and the air conditioning device 32 in parallel, the air exchanges heat with the phase-change energy storage device 31 and the air conditioning device 32 respectively and is directly introduced into the carriage after heat exchange, and the phase-change energy storage device 31 and the air conditioning device 32 will not affect each other, therefore the stable temperature of the respective processed air is ensured and the cooling or heating effect in the carriage is stable. The two branch pipelines can be opened separately and can be selected flexibly according to conditions so as to reduce the operation of the air conditioning device 32, or the air outside can be used at any time to charge the phase-change energy storage device 31, therefore the electric energy is saved. The air conditioning device 32 is connected to the phase-change energy storage device 31 through the charging air duct 33 so as to charge the phase-change energy storage device 31 with the air conditioning device 32 when necessary, therefore the stable operation of the combined-type automobile air conditioning system based on phase-change energy storage technology is ensured.

The above is only preferred embodiments of the present disclosure, and it should be noted that those of ordinary skills in the art can make several improvements and substitutions without departing from the technical principles of the present disclosure, and these improvements and substitutions should be considered as the protection scope of the present disclosure.

What is claimed is:

1. An automobile air conditioning system for rail vehicles and automobiles, comprising a phase-change energy storage air duct comprising a phase-change energy storage material provided within an air duct; the phase-change energy storage material configured to exchange heat with air in the air duct so as to keep a stable temperature of air flowing out from the air duct; further comprising a first branch pipeline and a second branch pipeline arranged in parallel between an air introduction pipeline and an inlet of a fan; the air introduction pipeline configured to introduce circulating air and/or fresh air, and the fan is configured to send air to a carriage to cool or heat in the carriage; the first branch pipeline is provided with a phase-change energy storage device comprising the phase-change energy storage air duct; and the second branch pipeline is provided with an air conditioner; wherein a charging air duct is provided between the air conditioner and the phase-change energy storage device, so as to charge the phase-change energy storage device with the air conditioner.

2. The automobile air conditioning system of claim 1, wherein the first branch pipeline and the second branch pipeline are correspondingly provided with a first valve and a second valve to switch opening states of the first branch pipeline and the second branch pipeline.

3. The automobile air conditioning system of claim 2, wherein a temperature sensor is provided on the phase-change energy storage device to feed back an energy storage state of the phase-change energy storage device.

4. The automobile air conditioning system of claim 3, further comprising a controller electrically connected to the air conditioner, the fan, the first valve, the second valve and the temperature sensor respectively.

5. The automobile air conditioning system of claim 1, wherein a pipeline connected to an outlet of the fan comprises a cooling air supply pipeline and a heating air supply pipeline; and wherein the cooling air supply pipeline and the heating air supply pipeline are both connected to the carriage.

6. The automobile air conditioning system of claim 1, wherein the phase-change energy storage duct further comprises a phase-change energy storage unit;
the phase-change energy storage unit comprises an outer layer and a cavity provided within the outer layer; and wherein the phase-change energy storage material is provided within the cavity, and the outer layer is connected to an inner wall of the air duct.

7. The automobile air conditioning system of claim 1, wherein an inner wall of the air duct of the phase-change energy storage duct is provided with an interlayer, and the phase-change energy storage material is provided within the interlayer.

8. The automobile air conditioning system of claim 6, wherein the phase-change energy storage unit extends close to the inner wall of the air duct and is fixed on the inner wall of the air duct.

9. The automobile air conditioning system of claim 6, wherein the phase-change energy storage unit protrudes from the inner wall of the air duct of the phase-change energy storage duct.

10. The automobile air conditioning system of claim 8, wherein the phase-change energy storage unit has a flat-plate structure, and a cross section of the phase-change energy storage unit along a length direction vertical to the air duct is a closed-loop structure.

11. The automobile air conditioning system of claim 6, wherein the phase-change energy storage unit extends or is distributed at intervals along a length direction of the air duct.

12. The automobile air conditioning system of claim 11, wherein the entire outer layer has a thin-wall structure and is made of a heat-conducting material.

* * * * *